March 3, 1964 N. J. ROCHE ETAL 3,123,791
PRESSURE TRANSDUCER
Filed March 29, 1961

INVENTORS
NORLIN J. ROCHE
WILLIAM B. PEGRAM
BY
Donald S. Cohen
ATTORNEY

United States Patent Office 3,123,791
Patented Mar. 3, 1964

3,123,791
PRESSURE TRANSDUCER
Norlin J. Roche, Norristown, and William B. Pegram, Swarthmore, Pa., assignors to International Resistance Company, Philadelphia, Pa.
Filed Mar. 29, 1961, Ser. No. 99,117
9 Claims. (Cl. 338—40)

The present invention relates to a pressure transducer, and more particularly to a pressure transducer which is constructed to largely overcome adverse effects caused by forces from shock, vibration, acceleration and the like.

In general, a pressure transducer comprises an electrical component having a variable output, such as a variable electrical resistor or the like, and a pressure responsive means, such as a Bourdon tube or bellows diaphragm, connected to the electrical component. In the use of the pressure transducer, a variation of the pressure applied to the pressure responsive means causes a movement of the pressure responsive means, and thereby causes a change in the output of the electrical component. The change in the output of the electrical component can be read directly by a suitable electrical measuring device, or the electrical component can be connected to a suitable control means which operates upon a change of the output of the electrical component to control the pressure being measured.

A problem with such pressure transducers arises when the pressure transducer is used on a moving mechanism, or on a mechanism which vibrates. In such instances outside forces caused by vibration, shock or acceleration may act on the transducer. Such outside forces can cause movement of the pressure responsive means, and thereby cause an undesired change in the output of the electrical component. Thus, the accuracy of the transducer is affected since it cannot be determined whether the change in the output of the electrical component was caused by a change in the pressure being measured, or by the outside forces.

It is an object of the present invention to provide a novel pressure transducer.

It is another object of the present invention to provide a pressure transducer which accurately measures any changes in pressure applied to the transducer.

It is a further object of the present invention to provide a pressure transducer which largely overcomes the effects of outside forces caused by shock, vibration, acceleration or the like.

Other objects will appear hereinafter.

For the purpose of illustrating the invention there is shown in the drawings a form which is presently preferred; it being understood, however, that this invention is not limited to the precise arrangements and instrumentalities shown.

Figure 1:
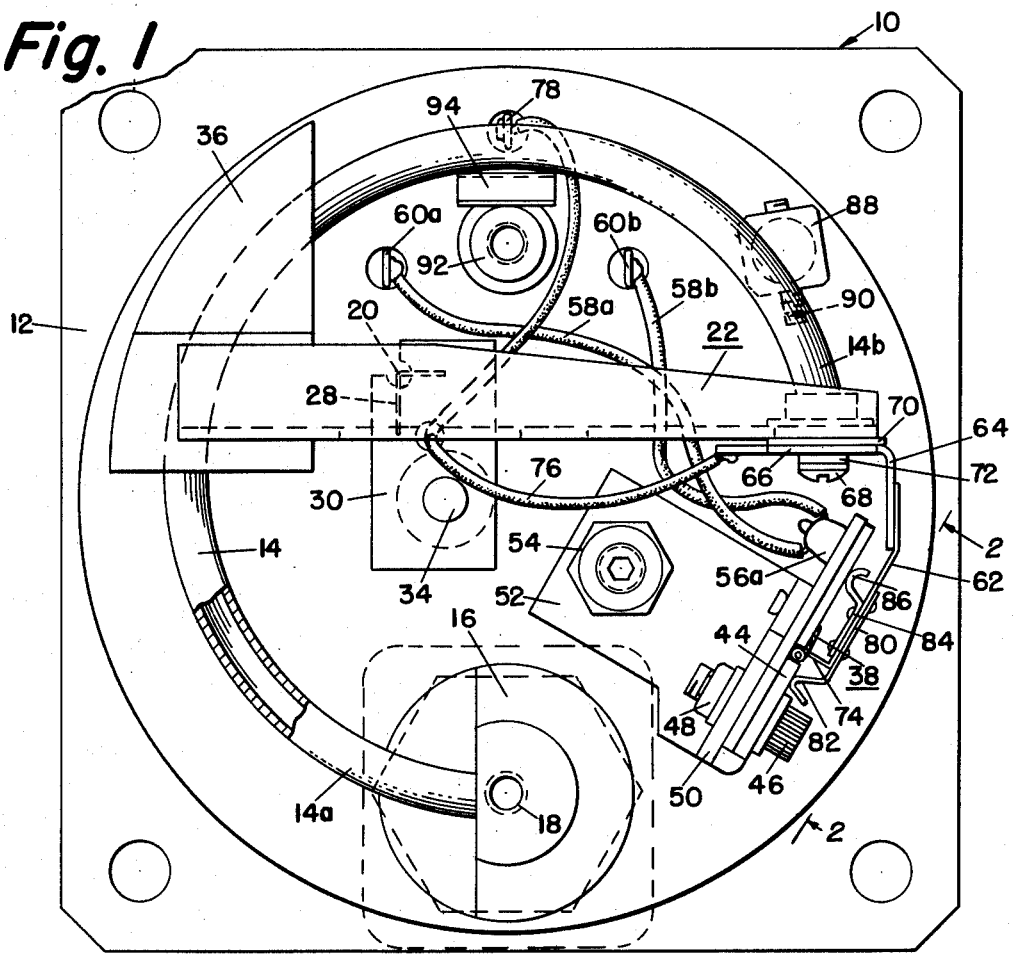
FIGURE 1 is a top elevational view of the pressure transducer of the present invention with the cover removed.

Referring initially to FIGURE 1, the pressure transducer of the present invention is generally designated as 10.

Pressure transducer 10 comprises a base plate 12, on which is mounted an arcuate Bourdon tube 14. One end 14a of the Bourdon tube 14 is secured to a pressure inlet port member 16. The pressure inlet port member 16 extends through and is mounted on the base plate 12. The inlet port member 16 has a blind passage 18 extending longitudinally from its end at the back of the base plate 12 to a point short of its end at the front of the base plate 12. The end 14a of the Bourdon tube 14 extends substantially radially through the inlet port member 16 to the blind end of the passage 18 so that the interior of the Bourdon tube 14 is in communication with the passage 18. The free end 14b of the Bourdon tube 14 is sealed closed. Thus, upon a variation of pressure applied to the interior of the Bourdon tube 14, the Bourdon tube will expand or contract to pivot the free end 14b of the Bourdon tube along an arc which has its center approximately at the point designated as 20.

Figure 3:
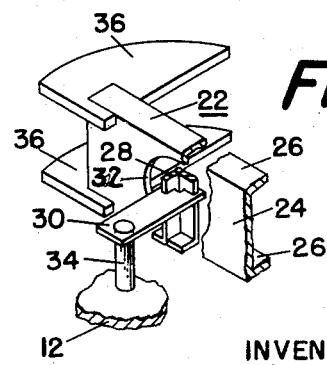
FIGURE 3 is a perspective view of a portion of the pressure transducer of the present invention with portions broken away.

An arm 22 has one end secured to the free end 14b of the Bourdon tube 14. The arm 22 extends from the free end 14b of the Bourdon tube 14 across the center of rotation 20 of the Bourdon tube. As shown in FIGURE 3, the arm 22 is channel-shaped with the base 24 of the arm being substantially perpendicular to the base plate 12, and the flanges 26 extending perpendicular to and in the same direction from the base 24. An L-shaped pivot post 28 extends between and is secured to the flanges 26 of the arm 22 at the center of rotation 20 of the free end 14b of the Bourdon tube 14. A supporting plate 30 is secured at one end to the pivot post 28 intermediate the ends of the pivot post. The supporting plate 30 extends perpendicularly from the pivot post 28 through an opening 32 in the base 24 of the arm 22. The other end of the supporting plate 30 is secured on a mounting post 34 which is secured to and projects from the base plate 12. Thus, the arm 22 is mounted on the base plate 12 for pivotation about the pivot post 28, which is on the center of rotation 20 of the free end 14b of the Bourdon tube 14. Pivotation of the arm 22 is permitted by the twisting of the pivot post 28. However, the L-shaped structure of the pivot post 28 prevents movement of the arm 22 in any direction radially from the center of rotation 20. A pair of counterweights 36 are secured to the free end of the arm 22.

Figure 2:
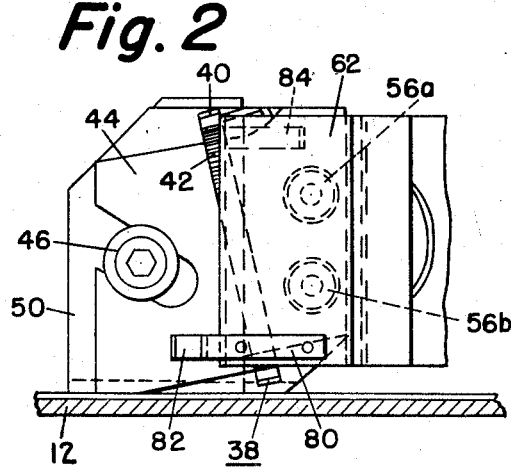
FIGURE 2 is an elevational view taken along line 2—2 of FIGURE 1.

An electrical resistance element 38 is supported on the base plate 12 in front of the free end 14b of the Bourdon tube 14. As shown in FIGURE 2, the resistance element 38 comprises a core 40 of an electrically insulated material, and a fine resistance wire 42 helically wound around and along the core 40. The resistance element 38 is mounted on a supporting plate 44 of an electrical insulating material. The supporting plate 44 is secured by a bolt 46 and nut 48 to the arm 50 of a mounting bracket 52. The mounting bracket 52 is secured to the base plate 12 by a screw 54 with the arm 50 extending substantially perpendicular to the base plate 12. Thus, the electrical component 38 is supported in a substantially upright position with respect to the base plate 12. The ends of the resistance wire 42 of the resistance element 38 are connected to terminal posts 56a and 56b on the supporting plate 44. Insulated wires 58a and 58b electrically connect the terminal posts 56a and 56b respectively to terminal posts 60a and 60b respectively, which extend through and are secured to the base plate 12. Thus, the ends of the resistance wire 42 of the resistance element 38 are electrically connected to the terminal posts 60a and 60b.

A contact plate 62 of an electrically conductive metal is secured at one end to the arm 64 of a metal contact carrier 66. Contact carrier 66 is secured by a screw 68 to the base 24 of the arm 22 at the end of the arm 22 which is secured to the free end 14b of the Bourdon tube 14. The arm 64 of the contact carrier 66 extends away from the free end 14b of the Bourdon tube 14 toward the resistance element 38 so that the contact 62 extends over the resistance element. A disc 70 of an electrical insulating material is provided between the contact carrier 66 and the base 24 of the arm 22 to electrically insulate the contact carrier from the arm 22, and a washer 72 of an electrically insulating material insulates the screw 68 from the contact carrier 66.

As previously stated, the free end of the contact 62 extends over and is parallel to the resistance element 38. The free end of the contact 62 is bent to provide a finger 74 which extends toward and slidably engages the resistance wire 42 of the resistance element 38. As shown in FIGURE 2, the contact finger 74 is of a width substantially equal to the length of the resistance element 38. Also as shown in FIGURE 2, the resistance element 38 is mounted on the supporting plate 44 so that the longitudinal axis of the resistance element is at a small angle with respect to the free edge of the contact finger 74 so as to provide substantially point contact between the contact finger and the resistance wire winding 42. Upon longitudinal movement of the contact 62, the contact will move back and forth across the resistance element 38 so as to move the point of contact between the contact finger 74 and the resistance wire winding 42 along the length of the resistance wire winding. An insulated wire 76 electrically connects the contact carrier 66 to a terminal post 78 which is secured to and extends through the base plate 12. Thus, the contact 62 is electrically connected to the terminal post 78.

A spring arm 80 is secured to the outer surface of the contact 62 along the edge of the contact adjacent the base plate 12. Spring arm 80 extends beyond the free end of the contact 62 and is provided with a spring finger 82 which extends toward and slidably engages the surface of the resistance element supporting plate 44 at one side of the resistance element. A second spring arm 84 is secured to the inner surface of the contact 62 along the other edge of the contact. Spring arm 84 is provided with a spring finger 86 which extends toward and slidably engages the surface of the resistance element supporting plate 44. The spring arms 80 and 84 and their spring fingers 82 and 86 maintain the contact 62 parallel to the resistance element 38.

A post 88 is mounted on the base plate 12 adjacent to and behind the free end 14b of the Bourdon tube 14. A stop screw 90 is threaded through the post 88 and projects beyond the post toward the free end 14b of the Bourdon tube 14. The end of the stop screw 90 adjacent the arm 22 is in the path of movement of the arm 22. Thus, upon the expansion of the Bourdon tube 14 causing the arm 22 to pivot about its pivot post 28, the arm 22 will engage the end of the stop screw 90 to limit the degree of pivotation of the arm. The stop screw 90 can be threaded back and forth through the post 88 to vary the permissible pivotation of the arm 22.

A post 92 is mounted on the base plate 12 adjacent the inner circumference of the Bourdon tube 14. An arched leaf spring 94 is secured at one end to the post 92 and slidably engages the surface of the Bourdon tube 14. For purposes which will be explained, the spring 94 dampens any vibrational movement of the Bourdon tube 14 in the direction perpendicular to the base plate 12. A cup-shaped cover, not shown, can be placed over and secured to the base plate 12 to protect the Bourdon tube 14, the resistance element 38, the contact 62, and the other elements of the transducer 10 from being damaged during the handling and use of the transducer.

In the use of the transducer 10 of the present invention, the open end of the pressure inlet port 16 is connected to the source of pressure to be measured, such as a flow line of a gas or liquid. The gas or liquid enters the Bourdon tube 14 through the passage 18 in the inlet port 16 so as to apply the pressure to the inside of the Bourdon tube. The pressure applied to the Bourdon tube 14 causes an expansion of the Bourdon tube, which in turn causes the free end 14b of the Bourdon tube to rotate about its center of rotation 20. The rotation of the free end 14b of the Bourdon tube 14 moves the contact 62 longitudinally to place the point of contact between the contact finger 74 and the resistance element 38 at a point along the resistance wire winding 42. By measuring the resistance between the terminal post 78 and either of the terminal posts 60a or 60b, and comparing the measured resistance to a pre-calibration of the transducer 10, the pressure within the Bourdon tube 14 can be determined. Any changes in the pressure being measured causes a movement of the free end 14b of the Bourdon tube 14 so as to change the position of the point of contact between the contact finger 74 and the resistance wire winding 42 of the resistance element 38. Thus, by continuously measuring the resistance between the terminal post 78 and either of the terminal posts 60a and 60b, any changes in the pressure being measured can be determined.

In the event that any outside forces caused by shock, vibration, acceleration or the like are applied to the transducer 10, the component of such forces parallel to the plane of the base plate 12 would tend to move the free end 14b of the Bourdon tube 14, and thereby change the resistance output of the transducer. However, as previously stated, the L-shaped structure of the pivot post 28 of the arm 22 prevent any movement of the free end 14b of the Bourdon tube 14 in directions radially of the center of rotation 20. Thus, such outside forces could only tend to cause the free end 14b of the Bourdon tube 14 to rotate about its center of rotation 20. However, the same outside forces which would tend to rotate the free end of the Bourdon tube 14 would also be applied to the counterweights 36 to tend to rotate the counterweights. The counterweights 36 are of a weight to substantially completely balance the weight on the free end of the Bourdon tube 14. In determining the size of the counterweights 36, the differences in the length of the moment arms between the center of rotation 20 and the counterweights 36 and the free end of the Bourdon tube 14 respectively are taken into consideration. Since the counterweights 36 and the free end of the Bourdon tube 14 are secured to opposite ends of the arm 22, an outside force applied to the transducer 10 would tend to rotate the counterweights 36 and the free end of the Bourdon tube 14 in opposite directions. Thus, any possible rotation of the free end 14b of the Bourdon tube 14 caused by outside forces applied to the transducer 10 is substantially completely balanced by a counter-rotation of the counterweights 36. Therefore, in the transducer 10 of the present invention, the position of the contact finger 74 along the resistance element 38 is substantially unaffected by any outside forces which may be applied to the transducer 10.

In the event that the outside forces applied to the transducer 10 have a component in the direction perpendicular to the plane of the base plate 12, the outside forces may cause the Bourdon tube 14 to vibrate in the direction perpendicular to the base plate 12. Such a vibration of the Bourdon tube 14 may tend to move the contact 62, and thereby adversely affect the resistance output of the transducer 10. However, the spring 94 which slidably engages the Bourdon tube 14 acts to dampen any such vibration of the Bourdon tube so as to prevent any movement of the contact 62. Also, since the contact 62 is a relatively wide plate and engages the resistance element 38 at only substantially point contact, any outside forces applied to the transducer 10 may cause the contact 62 to vibrate. Such a vibration of the contact 62 could cause an undesirable movement of the contact finger 74 along the resistance element 38. However, the spring arms 80 and 84 and their spring fingers 82 and 86 support the contact 62 on the resistance element supporting plate 44, and thereby prevent any vibration of the contact 62. Thus, in the transducer 10 of the present invention, any adverse effects which may be caused by outside forces applied to the transducer are overcome so that only a change in the pressure being measured can cause a change in the resistance output of the transducer.

The present invention may be embodied in other specific forms without departing from the spirit or essential attributes thereof and, accordingly, reference should be made to the appended claims, rather than to the foregoing specification as indicating the scope of the invention.

We claim:

1. A pressure transducer comprising a base plate, an arcuate Bourdon tube supported at one end on said base plate, the free end of said Bourdon tube being sealed closed and being movable along an arc upon a change in pressure applied within said Bourdon tube, a rigid arm secured at one end to the free end of said Bourdon tube, said arm being substantially parallel to said base plate and extending across the center of the arc of movement of the free end of the Bourdon tube, means supporting said arm on said base plate for rotation about the center of the arc of movement of the free end of the Bourdon tube but preventing movement of said arm radially of the center of the arc, an electrical resistance element mounted on said base plate, a contact secured to the free end of said Bourdon tube and having substantially point contact with said resistance element, said contact being slidable along said resistance element upon movement of the free end of the Bourdon tube, and a counterweight on the other end of the arm, said counterweight being of a size to balance the weight on the free end of the Bourdon tube.

2. A pressure transducer in accordance with claim 1 in which the arm is U-shaped with the base of the arm being substantially perpendicular to the base plate and the flanges of the arm being substantially parallel to the base plate, and the means supporting said arm on the base plate includes an L-shaped post extending between and secured to the flanges of the arm, said post being positioned at the center of the arc of movement of the free end of the Bourdon tube, and supporting means mounted on the base plate and secured to the post so as to permit twisting of said post.

3. A pressure transducer in accordance with claim 2 in which the supporting means for the post comprises a supporting plate secured adjacent one end to said post intermediate the ends of said post, said supporting plate extending parallel to the base plate and being mounted adjacent its other end on a mounting post supported on and extending upright from the base plate.

4. A pressure transducer in accordance with claim 1 including means engaging the Bourdon tube and adapted to dampen any vibration of said Bourdon tube.

5. A pressure transducer in accordance with claim 4 in which said vibration dampening means comprises a post mounted upright on the base plate adjacent the Bourdon tube, and a leaf spring secured to said post and slidably engaging said Bourdon tube.

6. A pressure transducer in accordance with claim 1 in which said resistance element comprises a cylindrical core of an electrical insulating material, said core being of a length substantially greater than its diameter, and a resistance material around and along the surface of said core, said resistance element being secured to a supporting plate which is mounted on the base plate substantially perpendicular to the base plate, and the contact comprises a plate of an electrically conductive metal having a finger at one end which slidably engages the resistance material of the resistance element, said contact finger being of a width substantially equal to the length of the resistance element, the longitudinal axis of said resistance element being at a small angle with respect to the contacting edge of the contact finger.

7. A pressure transducer in accordance with claim 6 including means for maintaining the contact edge of the contact finger parallel to the longitudinal axis of the resistance element.

8. A pressure transducer in accordance with claim 7 in which the means for maintaining the contact edge of the contact finger parallel to the longitudinal axis of the resistance element comprises a pair of spring arms secured to the contact at opposite edges of the contact, each of said spring arms having a spring finger slidably engaging the supporting plate for the resistance element.

9. A pressure transducer in accordance with claim 6 including three terminal posts extending through and secured to the base plate, means electrically connecting each end of the resistance material of the resistance element to a separate one of said terminal posts, and means electrically connecting the contact to the third terminal post.

References Cited in the file of this patent

UNITED STATES PATENTS 2,195,813     De Giers _____ Apr. 2, 1940
2,622,177     Klose _____ Dec. 16, 1952